J. B. NIXON.
COMBINED MILL AND DISPLAY DEVICE.
APPLICATION FILED JAN. 25, 1921.

1,405,318.

Patented Jan. 31, 1922.
2 SHEETS—SHEET 1.

WITNESSES
J. Herbert Bradley
Lois Wineman

INVENTOR
John B. Nixon
by W. G. Doolittle
Attorney

J. B. NIXON.
COMBINED MILL AND DISPLAY DEVICE.
APPLICATION FILED JAN. 25, 1921.

1,405,318.                                                        Patented Jan. 31, 1922.
2 SHEETS—SHEET 2.

WITNESSES
J. Herbert Bradley
Lois Vrueman

INVENTOR
John B. Nixon
by W. G. Doolittle
Attorney

UNITED STATES PATENT OFFICE.

JOHN BROWN NIXON, OF BUTLER, PENNSYLVANIA.

COMBINED MILL AND DISPLAY DEVICE.

1,405,318.     Specification of Letters Patent.    Patented Jan. 31, 1922.

Application filed January 25, 1921. Serial No. 439,878.

*To all whom it may concern:*

Be it known that I, JOHN BROWN NIXON, a citizen of the United States, residing at Butler, in the county of Butler and State of Pennsylvania, have invented certain new and useful Improvements in Combined Mill and Display Devices, of which the following is a specification.

My invention relates to a combined mill for preparing cereal grains for food and display device for attracting the attention of customers.

The invention is designed to be placed in large grocery stores, department stores, or other suitable places where it will be seen by the public, and comprises one or more milling machines of small capacity, housed in an ornamental structure. Adjacent the mills, within the housing, are suitable bins and disposed above these bins are other bins. One of the bins in the lower part of the structure is adapted to receive the whole grain, and a conveyor is provided for elevating grain from it to one of the upper bins, from whence it is normally fed into the mill. The mill delivers the ground cereal into a second lower bin, and a second conveyor lifts it to another of the upper bins. This bin is provided with an outlet chute from which the finished meal or cereal food may be withdrawn into bags, to be immediately sold.

Many parts of the apparatus are preferably transparent in order that prospective customers may see the meal in process of preparation. Different illuminating effects are preferably produced to attract customers. The grain is milled as it is used, and the buyer is insured of getting a fresh cereal food. The necessity of expensive moisture proof packages is dispensed with in distributing the food, and therefore it can be sold more cheaply and at greater profits.

While the foregoing describes broadly the nature of my invention, it may be more fully understood by reference to the accompanying drawings which illustrate a preferred form of the invention, and in which, Fig. 1 is a vertical longitudinal section of the device;

Figure 1:
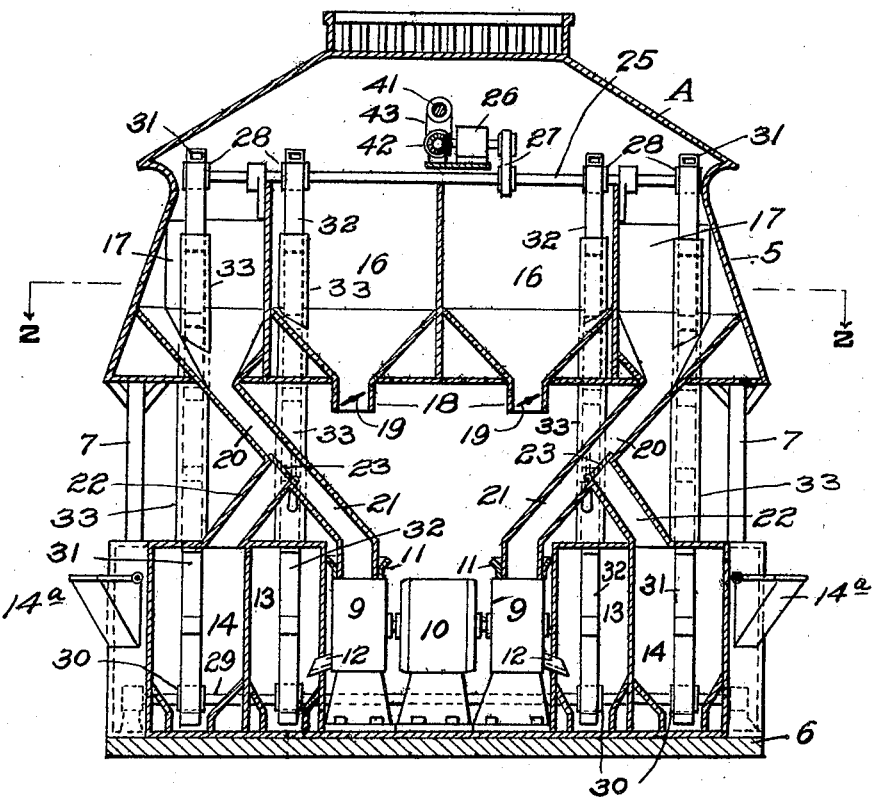
Figure 2:
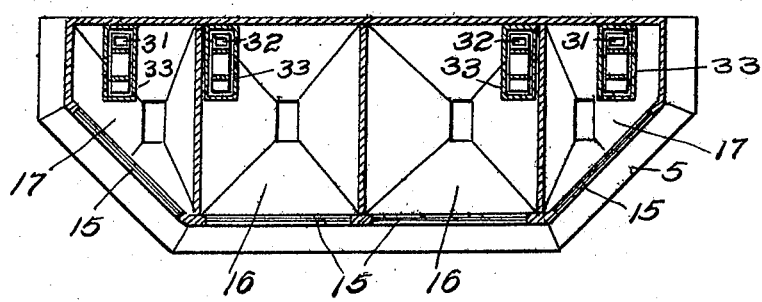
Fig. 2 is a transverse section on line 2—2 of Fig. 1.

Referring to the drawings, A designates generally the housing, the appearance of which is made to simulate that of an old fashioned wind-mill. It comprises an upper portion 5, a lower portion 6, intermediate supporting member 7, and a selling counter 8.

The device is preferably provided with two mills, one mill preferably being used for wheat, the other for oats, although, of course, but a single mill might be employed, or any desirable number of them, and any suitable cereal could be prepared. I have shown in the drawings a device having two mills. These are located in the lower section 6 of the housing, and are indicated at 9. They are driven by a common motor 10 which is centrally positioned, and one of them are at each side of the motor. The mills have hoppers 11 and outlet chutes 12. At the side of each mill and in the housing is a bin 13, into which the chutes 12 deliver. The bottoms of the bins 13 are inclined. At the side of each of the bins 13 is another bin 14, these bins being supply bins and also have an inclined bottom. They are provided with suitable hoppers or other filling means 14ª.

In the upper section of the housing, which is provided with a plurality of windows 15, are two central bins 16 and two end bins 17, the windows 15 forming the front walls of the bins. The bins 16 and 17 are also preferably provided with sloping bottoms. The central bins 16 are provided with spouts 18, from which the ground cereal is dispensed into small bags, 19 indicating controlling means in the spouts.

Extending downwardly from each of the end bins 17 are inclined chutes 20 having branches 21 and 22. Branch 21 delivers into the hoppers 11 of the respective mills, while the branches 22 deliver into the top of the end supply hoppers or bins 14. At 23, are gates for directing the passage of grain into the desired one of the two branches 21 and 22.

Extending across the top of the upper portion 5 of the housing is a line shaft 25 which may be driven in any suitable manner, such as by a motor 26 and belt 27.

Figure 3:
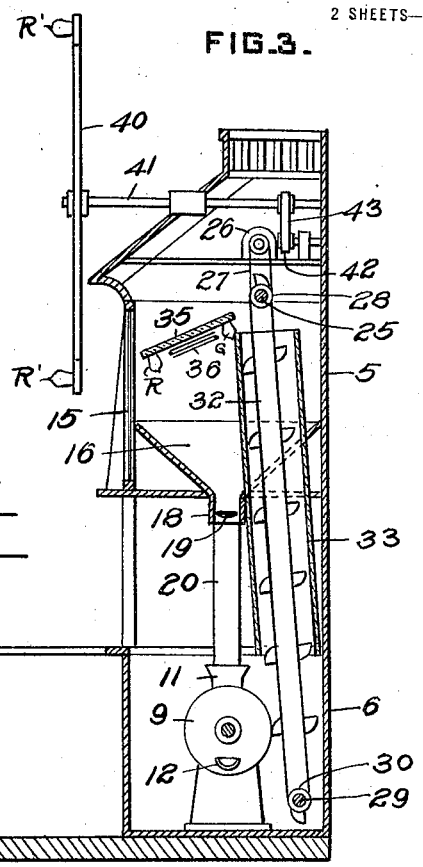
Fig. 3 is a vertical transverse section thereof.

At suitable positions on the line shaft, are pulleys 28. In the lower portion 6 of the housing is a second line shaft 29 having pulleys 30 thereon, one pulley being positioned near the bottom of each of the four bins. Extending around pulleys 30 in each of the lower end bins 14, upwardly over the corresponding pulleys 28 on shaft 25, are bucket conveyors 31. Passing over the pulleys 30 in the inner lower bins 13 are similar conveyors 32 which pass over the other pulleys on shaft 25. The line shaft 29 is out of vertical alinement with shaft 25 as shown clearly in Fig. 3, in order that the conveyors 31 and 32 will have a forward inclination. The conveyors are enclosed in casings 33 which are preferably transparent, so that, while the grain or cereal is protected from dirt and exposure, they permit the operation of the conveyors to be seen by by-standers or passers-by, thereby attracting attention.

In each of the upper compartments 16 and 17 is arranged a sloping shelf 35 on to which the grain or cereal from the conveyors will fall and be directed downwardly past the windows 15. The shelfs 35 are preferably made of glass, and electric heating elements 36 may be placed thereunder, in order to dry the grain as it passes thereover. Electric lamps R, G, of different colors, may also be placed thereunder or in other suitable places in the bins, for the purposes of illustration, R representing red lights, and G, green lights.

Figure 5:
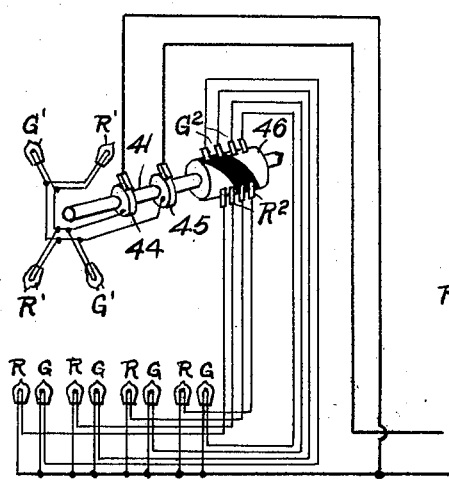
Fig. 5 is a diagrammatic view of the circuits for controlling the illuminating effects.

In order to give the appearance of an old-fashioned wind-mill, an ornamental fan 40 is provided at the front of the housing, and it is mounted on a shaft 41 having a pulley 42 thereon driven through a belt or other suitable means 43 by the motor 26. The fan or wind-wheel 40 preferably has four arms or vanes, on the end of which are preferably arranged alternately colored lamps R' and G'. As indicated in Fig. 5, they are connected in parallel and supplied with current through ring contacts 44 and 45 on the shaft 41. It is desired that the lights R and G back of windows 15 vary with the rotation of the wind-wheel 40. I prefer to arrange them so that as one of the vanes comes opposite the first window 15 carrying a red light R', the lights R behind the first window will light, while lights G will be extinguished. As the fan turns farther, each following window will be illuminated by lights R until all are the same, at which time the next vane having a lamp G' will be opposite the first window 15, and the lights G in that window will be in circuit, while the lights R will be cut out. This change of color will follow successively with the movement of the fan.

Figure 6:
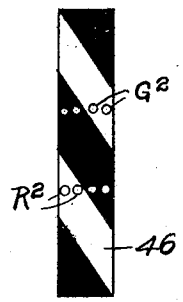
Fig. 6 is a diagrammatic view showing a representation of the commutator face of a rotary switch employed in Fig. 5.
Figure 4:
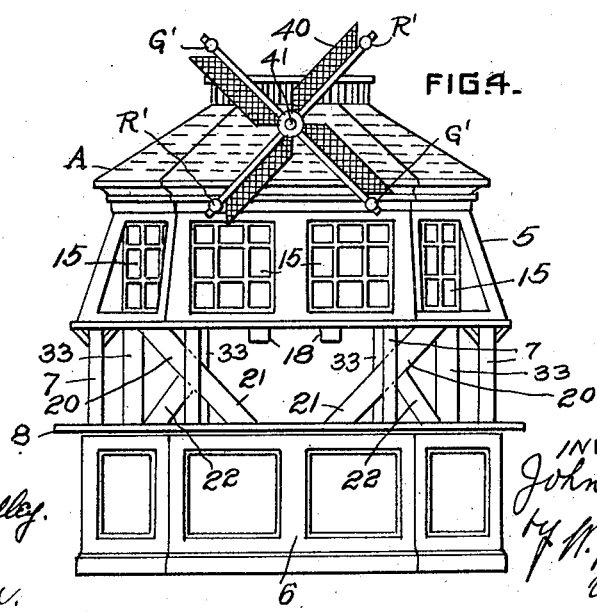
Fig. 4 is a front elevation thereof.

For accomplishing this effect, I provide a commutator 46 on shaft 40 having spirally arranged conducting areas thereon, as indicated in Fig. 6. Two sets of brushes $R^2$ and $G^2$ are suitably positioned to contact therewith. The four brushes $R^2$ control the circuits to the lamps R in the four windows 15, and the four brushes $G^2$ control the circuits for the lamp G. By reason of the spirally arranged conducting and insulating areas on the contact surface of the commutator 46, the lights may, upon proper positioning of the brushes, be so cut into and out of circuit that the changes in illumination effects will follow in the proper sequence. The commutator, being on the shaft 41, necessarily revolves synchronously with the fan, thereby insuring that the change of lighting effects is concomitant with its rotation.

In operation, the whole grain is placed in supply bins 14 through the hoppers $14^a$. As previously mentioned, it is preferred that wheat be placed in one of the hoppers, oats in the other. Motor 26 is then operated to drive the line shaft 25, thereby setting conveyors 31 and 32 in operation. At the same time, the motor 10 is started for driving the mills 9. The conveyors 31 will elevate the grain from bins 14 and empty it into bins 17, the grain falling over the shelves 35. The grain emptied into the bins 17 gravitates through chutes 20, where the gate 23 directs in into branch 21 and thence into the mills 9. The meal or finished product coming from the mills 9 is delivered to bins 13, where the conveyors 32 lift and dump it into bins 16. The operator, standing behind the counter 8, can dispense the meal to customers, according to the demand, by filling bags from the drop 18. Should the grain be milled faster than it is sold, the gates 23 can be adjusted to direct part or all of the grain through branch 22, back to the supply bins 14. Thus, the grain may always be milled fresh, as no large supply need be accumulated in the bins 16, even though, for the purpose of advertising, it be desired to keep the device in operation.

The provision of transparent boxing for the lifts and of windows in the various upper bins, makes the device, when in operation, attractive to the public. The provision of the fan 40 and means for changing the lighting effects with the rotation of the fan, also add to the attractive features of the mill.

While I have described the preferred form of my invention, it will be obvious that changes may be made within the scope of the appended claims.

What I claim is:

1. An apparatus for grinding and dispensing grain comprising a housing, a grinding mill in the lower portion of said housing, a bin into which the grinding mill delivers, a supply bin adjacent thereto, a bin in the upper portion of the housing over said supply bin, a conveyor for elevating grain from the supply bin thereto, a chute extending therefrom to said mill, a second bin in the upper portion of said housing, and a conveyor for conducting the milled grain from the bin adjacent said mill to said second upper bin, the arrangement enabling the whole grain to be put into a lower bin and fed into the mill in desired quantities from an upper bin and enabling the milled grain to be dispensed from an upper bin.

2. An apparatus for grinding and dispensing grain comprising a housing, a grinding mill in the lower portion of said housing, a bin into which the grinding mill delivers, a supply bin adjacent thereto, a bin in the upper portion of the housing over said supply bin, a conveyor for elevating grain from the supply bin thereto, a chute extending therefrom to said mill, a branch in said chute for directing grain back to the supply bin, means for controlling the direction of passage of the grain, a second bin in the upper portion of said housing, and a conveyor for conducting the milled grain from the bin adjacent said mill to said second upper bin.

3. An apparatus for grinding and dispensing grain comprising a plurality of upper bins and a plurality of lower bins, one of which is a supply bin, a mill delivering to one of the lower bins, means for conveying whole grain from the supply bin to one of the upper bins, means for conducting grain from such upper bin to the mill, means for lifting the ground grain from the bin to which said mill delivers to another of the upper bins, and means for withdrawing such ground grain from the upper bin.

4. An apparatus for grinding and dispensing grain comprising a plurality of upper bins and a plurality of lower bins, one of which is a supply bin, a mill delivering to one of the lower bins, means for conveying whole grain from the supply bin to one of the upper bins, means for conducting grain from such upper bin to the mill, means operable for diverting the grain from the mill to the supply bin, means for lifting the ground grain from the bin to which said mill delivers to another of the upper bins, and means for withdrawing such ground grain from the upper bin.

5. A combined display and milling apparatus for grinding and dispensing grain comprising a housing simulating a building in appearance having upper and lower portions, a plurality of bins in the upper portion, a plurality of bins in the lower portion, one of said bins being a supply bin, a mill adapted to deliver ground cereal to another of the bins in the lower portion, transparent fronts for the upper bins which fronts also form windows for the building, a conveyor having a transparent casing for elevating grain from the supply bin to one of the bins in the upper portion, a chute for conveying the grain therefrom to said mill, a second conveyor having a transparent casing for elevating the ground cereal from the bin to which the mill delivers to another of the upper bins, and means for dispensing the ground cereal from such upper bin.

6. A device for grinding and dispensing grain comprising a housing having a plurality of adjacent bins in the upper part thereof, a plurality of bins in the lower part thereof, a mill, means for transferring the grain from the lower bins to the upper, and for transferring it from some of the upper bins to the lower ones, and for passing it through the mill, some of the lower bins being adapted to receive the milled grain, and means for conveying the milled grain to other of the upper bins.

7. A combined display and milling device for grinding and dispensing grain comprising a housing simulating in appearance a wind-mill, a grinding mill in the housing and means for conducting whole grain thereto and conveying ground cereal therefrom, a selling counter extending in front of the housing, but spaced therefrom to provide a place for an attendant, means whereby an attendant may obtain the ground cereal from the mill, and an ornamental fan mounted in the housing and adapted to be rotated when the mill is in operation for attracting customers to the device.

8. A combined display and milling device for grinding and dispensing grain comprising a housing, a plurality of windows in the upper part of said housing, a plurality of bins in the upper part of said housing and having their interiors visible through the windows, a mill, means for delivering grain to be passed to the mill to certain of the bins, means for delivering the ground cereal to certain of the bins, an ornamental fan at the front of said housing, means for rotating the fan, and means in the bins for producing certain illuminating effects in said bins, and means operating synchronously with the fan for varying the illuminating effects concomitantly with the rotation of the fan.

9. A combined display and milling device for grinding and dispensing grain comprising a housing, a plurality of windows in the upper part of said housing, a plurality of bins in the upper part of said housing and having their interiors visible through the windows, a mill below the bins, means for delivering grain to be passed to the mill to certain of the bins, means for delivering the ground cereal to certain of the bins, an ornamental fan having vanes at the front of said housing, which vanes move in front of said windows, alternately colored lights on said vanes, means for rotating the fan, lights in the bins corresponding to those on the vanes of said fan, and means operating synchronously with the fan for lighting those lights in the bins corresponding with the color of the light on the vane passing before the window concomitantly with the passage of such vane in front of the window.

10. An apparatus for grinding and dispensing cereal comprising a housing, a grinding mill in the lower portion of the housing, a bin into which the grinding mill delivers, a supply bin adjacent thereto, a bin in the upper part of the housing over said supply bin, a conveyor for elevating grain from the supply bin thereto, a drier over which said grain falls into the said upper bin, a chute extending therefrom to said mill, a second bin in the upper portion of the housing, a conveyor for elevating the milled grain from the bin adjacent the mill to said second upper bin, and a drier in the second upper bin over which the milled grain passes from said conveyor.

11. A combined display and milling apparatus for grinding and dispensing grain comprising a housing having upper and lower portions, a plurality of bins in the upper portion, a plurality of bins in the lower portion, one of said bins being a supply bin, a mill adapted to deliver ground cereal to another of the bins in the lower portion, transparent fronts for the upper bins, a conveyor having a transparent casing for elevating grain from the supply bin to one of the bins in the upper portion, a chute for conveying the grain therefrom to said mill, a second conveyor having a transparent casing for elevating the ground cereal from the bin to which the mill delivers to another of the upper bins, and means for dispensing the ground cereal from such upper bin, and shelves in the upper bins for directing the contents of the conveyors forwardly toward the transparent fronts thereof.

In testimony whereof I affix my signature in presence of two witnesses.

JOHN BROWN NIXON.

Witnesses:
W. G. DOOLITTLE,
LOIS WINEMAN.